US011428326B2

(12) United States Patent
Gomi

(10) Patent No.: US 11,428,326 B2
(45) Date of Patent: Aug. 30, 2022

(54) CENTRIC BUTTERFLY VALVE

(71) Applicant: KITZ CORPORATION, Chiba (JP)

(72) Inventor: Takeshi Gomi, Nagano (JP)

(73) Assignee: KITZ CORPORATION, Chiba (JP)

( * ) Notice: Subject to any disclaimer, the term of this patent is extended or adjusted under 35 U.S.C. 154(b) by 0 days.

(21) Appl. No.: 17/418,016

(22) PCT Filed: Dec. 26, 2019

(86) PCT No.: PCT/JP2019/051263
§ 371 (c)(1),
(2) Date: Jun. 24, 2021

(87) PCT Pub. No.: WO2020/138347
PCT Pub. Date: Jul. 2, 2020

(65) Prior Publication Data
US 2022/0090684 A1    Mar. 24, 2022

(30) Foreign Application Priority Data

Dec. 28, 2018  (JP) .............................. JP2018-248555
Dec. 28, 2018  (JP) .............................. JP2018-248557

(51) Int. Cl.
*F16K 1/226*  (2006.01)
*F16K 25/00*  (2006.01)

(52) U.S. Cl.
CPC ............ *F16K 1/2261* (2013.01); *F16K 25/00* (2013.01)

(58) Field of Classification Search
CPC ......... F16K 1/2261; F16K 1/226; F16K 25/00
USPC ................................................. 251/305–308
See application file for complete search history.

(56) References Cited

U.S. PATENT DOCUMENTS

| | | | | |
|---|---|---|---|---|
| 3,043,557 A | * | 7/1962 | Stillwagon | ............ F16K 1/2265 |
| | | | | 137/454.2 |
| 4,327,765 A | * | 5/1982 | Wilson | .................. F16K 1/2268 |
| | | | | 251/306 |
| 6,076,836 A | * | 6/2000 | Bretschneider | ...... B65G 69/183 |
| | | | | 277/642 |
| 9,816,618 B2 | * | 11/2017 | Yates | ..................... F16K 1/2261 |
| 2014/0151592 A1 | * | 6/2014 | Ha | ........................ F16K 1/2261 |
| | | | | 73/40.7 |

FOREIGN PATENT DOCUMENTS

| | | |
|---|---|---|
| CN | 105003668 | 10/2015 |
| JP | 60-12762 | 1/1985 |
| JP | 61-140675 | 6/1986 |

OTHER PUBLICATIONS

International Search Report dated Mar. 17, 2020 in International (PCT) Application No. PCT/JP2019/051263.

* cited by examiner

*Primary Examiner* — John Bastianelli
(74) *Attorney, Agent, or Firm* — Wenderoth, Lind & Ponack, L.L.P.

(57) ABSTRACT

A centric butterfly valve (1) in which top and bottom boss surfaces (19, 29) are formed to be spherical, an outer peripheral end of the blade portion of the valve disk (24) is formed to be an M-shaped section part (29) with round-shaped apex parts (27) and a round-shaped valley part (28) smoothly linked, and the centric butterfly valve has a valve disk (3) having an extended part (41) obtained by successively and slightly extending the spherical surface of each of the top and bottom boss surfaces (19, 20) to a blade portion (40) side.

9 Claims, 13 Drawing Sheets

(a)

(b)

CENTRIC BUTTERFLY VALVE

BACKGROUND OF THE INVENTION

1. Technical Field

The present invention relates to centric butterfly valves and, in particular, to a centric butterfly valve in which an M-shaped-section outer peripheral seal part is provided at an outer peripheral end of the blade portion of the valve disk to improve sealability around the valve disk and around stems and reduce open/close operation torque.

2. Background Art

In general, butterfly valves have a simple structure and are of small sizes and lightweight, and have both of a merit in structure in which a surface-to-surface dimension can be decreased compared with other valve types and a merit in function in which valve open/close operations can be performed in an operation range of 90 degrees and thus the butterfly valves are suitable for automated operation and they are excellent in flow rate control. Thus, the butterfly valves are widely used in various scenes, such as water supply and drainage, air-conditioning facilities, and factor processes, in various modes.

The butterfly valve is configured to include a body inside which a flow path is formed, a stem supported by the body, and a valve disk arranged in the flow path of the body and fixedly attached to the stem so as to rotate together with the stem, in which the valve disk is rotated inside the body by using the stem to cause an outer peripheral part of the valve disk to be pressure-contacted to or be separated from the inner peripheral surface of the flow path, thereby opening and closing the valve.

Thus, in this butterfly valve, it is important to ensure sealability between the valve disk and the inner peripheral surface of the flow path formed inside the body and around the stem to prevent leakage of a fluid and suppress operation torque at the time of valve opening and closing to improve operability.

As a centric butterfly valve for improving sealability at the time of valve closing and reducing operation torque at the time of valve opening and closing, for example, a centric butterfly valve is disclosed in PTL 1 in which the valve disk is covered with an elastic seal member being fixed thereto, and an annular protrusion is formed on a boss surface and a circumferential protrusion is formed on an outer peripheral end of the blade portion of the valve disk, respectively, with the annular protrusion and the circumferential protrusion being made successive in a state without a step.

In this centric butterfly valve, the circumferential protrusion and the annular protrusion are coupled in a state without a step. Thus, a leak of a fluid from around the stem is prevented to allow sealability to be exerted. Also, since the annular protrusion and the circumferential protrusion are provided to have an arc-shaped section. Thus, crush margins of the annular protrusion and the circumferential protrusion at the time of valve closing are small and are easily deformed, thereby allowing the open/close operation torque of the valve to be decreased.

CITATION LIST

Patent Literatures

PTL 1: Japanese Patent Application Laid-Open No. 61-140675

SUMMARY OF THE INVENTION

1. Technical Problem

However, in the centric butterfly valve disclosed in PTL 1, to reduce open/close operation torque of the valve, the widths of the annular protrusion and the circumferential protrusion each having an arc section are formed to be smaller than the width of the elastic seal member of the blade portion of the valve disk, thereby decreasing the crush margins of the annular protrusion and the circumferential protrusion at the time of valve closing. Thus, even if the circumferential protrusion is crushed at the time of valve closing, the surface pressure of the blade portion of the valve disk tends not to be uniform, posing a problem in sealability.

Moreover, in these annular protrusion and circumferential protrusion each having a small width and an arc section, when local friction force occurs due to a contact with a seal surface of the inner flow path at the time of valve closing, stress concentrates on these protrusions and a starting point of rupture tends to occur, posing a problem in durability.

The present invention has been developed to solve the above-described problem, and has an object of providing a centric butterfly valve which has favorable sealability around a valve disk and around stems and small open/close operation torque and is also excellent in durability.

2. Solution to the Problem

To achieve the above-described object, the invention according to claim 1 is directed to a centric butterfly valve in which a valve disk having top and bottom boss surfaces provided upper and lower parts and an outer peripheral seal part provided at an outer peripheral end of a blade portion of the valve disk is rotatably provided inside a cylindrical-type body via stems, the outer peripheral seal part is an M-shaped section part with two linear round-shaped apex parts positioned on a primary side and a secondary side and a round-shaped valley-bottom part positioned between the apex parts smoothly linked, this M-shaped section part has the two linear apex parts crushed in a fully-closed state and other portions moved to a direction of a space of the valley-bottom part to form two linear seal parts by the apex parts, an inner peripheral surface of the body has a seal surface formed of an arc surface and, when the outer peripheral end of the blade portion of the valve disk makes contact with the arc surface of the body, the valley-bottom part of the M-shaped section part becomes in a state of being substantially in contact with the arc surface.

The invention is also directed to the centric butterfly valve in which vicinities of two linear apex parts of the M-shaped section part have roundness dimensions substantially equal to each other, and the valley part has a roundness dimension in a range on order of ½ to twice as large as the roundness dimensions in the vicinities of the apex parts.

The invention is also directed to the centric butterfly valve in which the top and bottom boss surfaces and the apex parts of the M-shaped section part form part of a spherical surface having a substantially equal radius from a center of the valve disk.

The invention is also directed to the centric butterfly valve in which the top and bottom boss surfaces are formed to be spherical, and the centric butterfly valve has the valve disk provided with an extended portion obtained by successively and slightly extending this spherical surface of each of the top and bottom boss surfaces to a blade portion of the valve disk side.

The invention is also directed to the centric butterfly valve in which the top and bottom boss surfaces and the valley-bottom part of the M-shaped section part of the outer peripheral end of the blade portion of the valve disk of the blade portion of the valve disk are linked by smooth tilted surfaces.

The invention is also directed to the centric butterfly valve in which the extended part has a shape extending most to the blade portion of the valve disk side at a position of the apex part of the outer peripheral end of the blade portion of the valve disk and being gradually narrower in width toward this most extended position.

The invention is also directed to the centric butterfly valve in which a distance of the valley-bottom part of the M-shaped section part from a center of the valve disk is substantially equal to a distance of an inner peripheral surface of the body from the center of the valve disk.

3. Advantageous Effects of the Invention

The invention, with the outer peripheral seal part provided to the outer peripheral end of the blade portion of the valve disk is formed to be an M-shaped section part, two linear seal parts are linearly formed in parallel at the time of valve closing and, of these, on the linear seal part positioned on a primary side, the load of the fluid pressure concentrates, and thereby high seal surface pressure occurs. Thus, favorable sealability can be obtained.

Also, the two linear seal parts linearly formed in parallel are formed over the entire outer peripheral end of the blade portion of the valve disk equidistantly from the center of the valve disk. Thus, uniform surface pressure can be obtained at the outer peripheral end of the blade portion of the valve disk, and favorable sealability can be obtained.

Furthermore, in accordance with valve opening and closing, the outer peripheral seal part on the outer peripheral end of the blade portion of the valve disk is repeatedly pressurized and, in particular, the vicinity of the valley-bottom part of the M-shaped section part repeatedly receives compressive force. However, since the outer peripheral seal part takes the M-shaped section part with the round-shaped apex parts and the round-shaped valley-bottom part smoothly linked, the occurrence of stress concentration is suppressed to prevent the occurrence of a starting point of rupture. Thus, durability of the outer peripheral seal part can be improved.

From another aspect of the invention, with the roundness dimensions of the apex parts and the valley part of the M-shaped section part of the outer peripheral seal part formed to be in a range so as to be close to each other, stress occurring in the M-shaped section part at the time of valve closing can be effectively dispersed. Thus, the stress occurring in the outer peripheral seal part in a concentrated manner can be suppressed, and durability of the outer peripheral seal part can be improved.

In this case, with the inner peripheral surface of the body formed as an arc surface, the top and bottom boss surfaces with the apex parts formed as spherical surfaces can be uniformly pressurized, and favorable sealability can be obtained in the top and bottom boss surfaces of the valve disk.

Also, with the inner peripheral surface of the body formed as an arc surface, uniform surface pressure can be applied to the outer peripheral end of the blade portion of the valve disk within a range of this arc surface. Thus, even if the closed position of the valve disk is slightly shifted, if that shift is within a range where the arc surface is formed, it does not affect sealability and stable sealability can be obtained.

When the outer peripheral end of the blade portion of the valve disk makes contact with the arc surface of the body, the valley-bottom part of the M-shaped section part becomes in a state of being substantially in contact with the arc surface, and thereby the movement amount of the elastic body of the valley-bottom part can be minimized or brought to zero at the time of valve closing. In addition, the apex parts pressurized and crushed by the seal surface can be let escape to the direction of the valley-bottom part, thereby less affecting other portions, preventing excessive stress from occurring to the outer peripheral seal part, and allowing suppression of an increase in open/close operation torque of the valve. Here, the elastic member at the crushed portions of the apex parts easily moves to the direction of the space that is present between the two apex parts of the M-shaped section part to prevent the surface pressure of the elastic member of the M-shaped section part of the outer peripheral seal part from excessively increasing, thereby also allowing suppression of an increase in the open/close operation torque.

From another aspect of the invention, the top and bottom boss surfaces and the apex parts of the M-shaped section part of the outer peripheral seal part of provided to the outer peripheral end of the blade portion of the valve disk form part of a spherical surface having a substantially equal radius from a center of the valve disk. Thus, at the time of full closing of the valve, the elastic member covering the top and bottom boss surfaces and the outer peripheral seal part of the blade portion of the valve disk are uniformly crushed. Thus, favorable sealability can be obtained over the entire periphery of the valve disk.

From another aspect of the invention, the top and bottom boss surfaces are formed to be spherical, and the centric butterfly valve has the valve disk provided with an extended portion obtained by successively and slightly extending the spherical surface of each of the top and bottom boss surfaces to a blade portion of the valve disk side. Thus, at the time of full closing of the valve, by the pressure force from the seal surface of the body, the elastic member covering the top and bottom boss surfaces and the outer peripheral seal part of the blade portion of the valve disk are uniformly crushed. Thus, favorable sealability can be obtained over the entire periphery of the valve disk.

Also, with provision of the extended portion obtained by successively and slightly extending the spherical surface of each of the top and bottom boss surfaces to the blade portion of the valve disk side, the top and bottom boss surfaces and the valve disk outer peripheral end are successively linked. At a fully-closed position, the elastic member covering from the top and bottom boss surfaces to the apex parts of the M-shaped section part of the valve disk outer peripheral end is uniformly crushed. Thus, a portion which leads to leakage or the like hardly occurs and sealability around the stems can be improved.

From another aspect of the invention, the top and bottom boss surfaces and the valley-bottom part of the M-shaped section part of the outer peripheral end part of the blade portion of the valve disk are linked by smooth tilted surfaces. Thus, the occurrence of stress concentration in the outer peripheral seal part when the top and bottom boss surfaces are pressurized by the seal surface of the body is suppressed, and durability of the outer peripheral seal part can be improved.

From another aspect of the invention, the extended part has a shape extending most to the blade portion of the valve disk side at the position of the apex part of the outer peripheral end of the blade portion of the valve disk and being gradually narrower in width toward this most extended position. Thus, the top and bottom boss surfaces and the apex parts of the M-shaped section part of the outer peripheral end of the blade portion of the valve disk part can be successively and smoothly connected. Thus, at the fully-closed position, the elastic member is uniformly pressurized from the top and bottom boss surfaces to the apex parts of the M-shaped section part of the valve disk outer peripheral end, stress hardly concentrates on the elastic member, and sealability around the valve disk and around the stems can be improved.

From another aspect of the invention, the distance of the valley-bottom part of the M-shaped section part of the outer peripheral seal part from the center of the valve disk is substantially equal to a distance of the inner peripheral surface of the body from the center of the valve disk. Thus, if the valve disk is at the fully-closed position, the valley-bottom part of the M-shaped section part is hardly pressurized by the inner peripheral surface of the body, and the movement amount of the elastic member of the valley-bottom part is small. In addition, the portions of the apex parts of the M-shaped section part of the outer peripheral seal part pressurized by the inner peripheral surface of the body are crushed and can escape to the direction of this valley-bottom part. Thus, influences on the other portions of the outer peripheral seal part are small, and displacement of the elastic member in the outer peripheral seal part as a whole is suppressed. Thus, the open/close operation torque of the valve can be reduced.

DETAILED DESCRIPTION OF EMBODIMENTS OF THE INVENTION

In the following, one embodiment of the centric butterfly valve in the present invention is described in detail based on the drawings.

Figure 1:
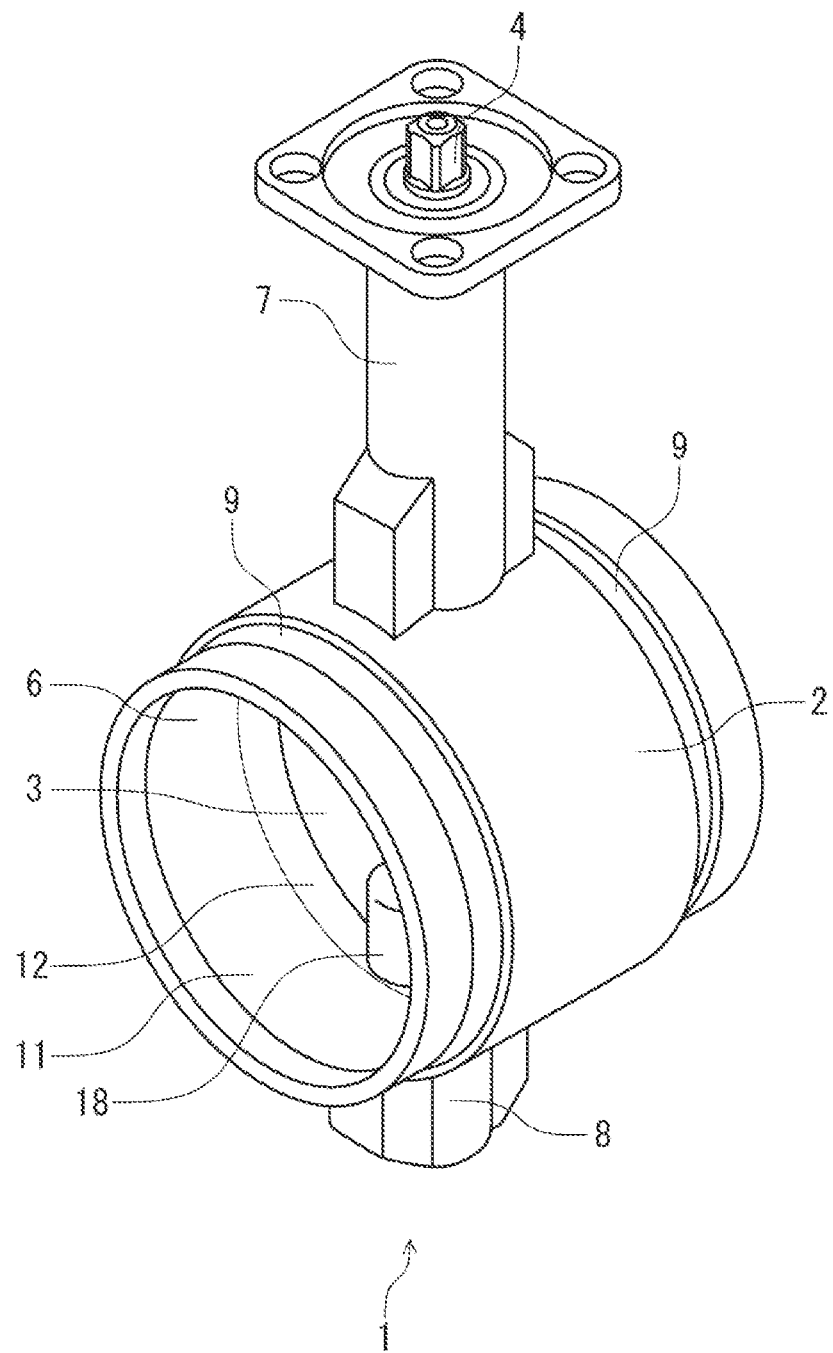
FIG. 1 is a perspective view depicting the outer appearance of a centric butterfly valve in the present invention.
Figure 2:
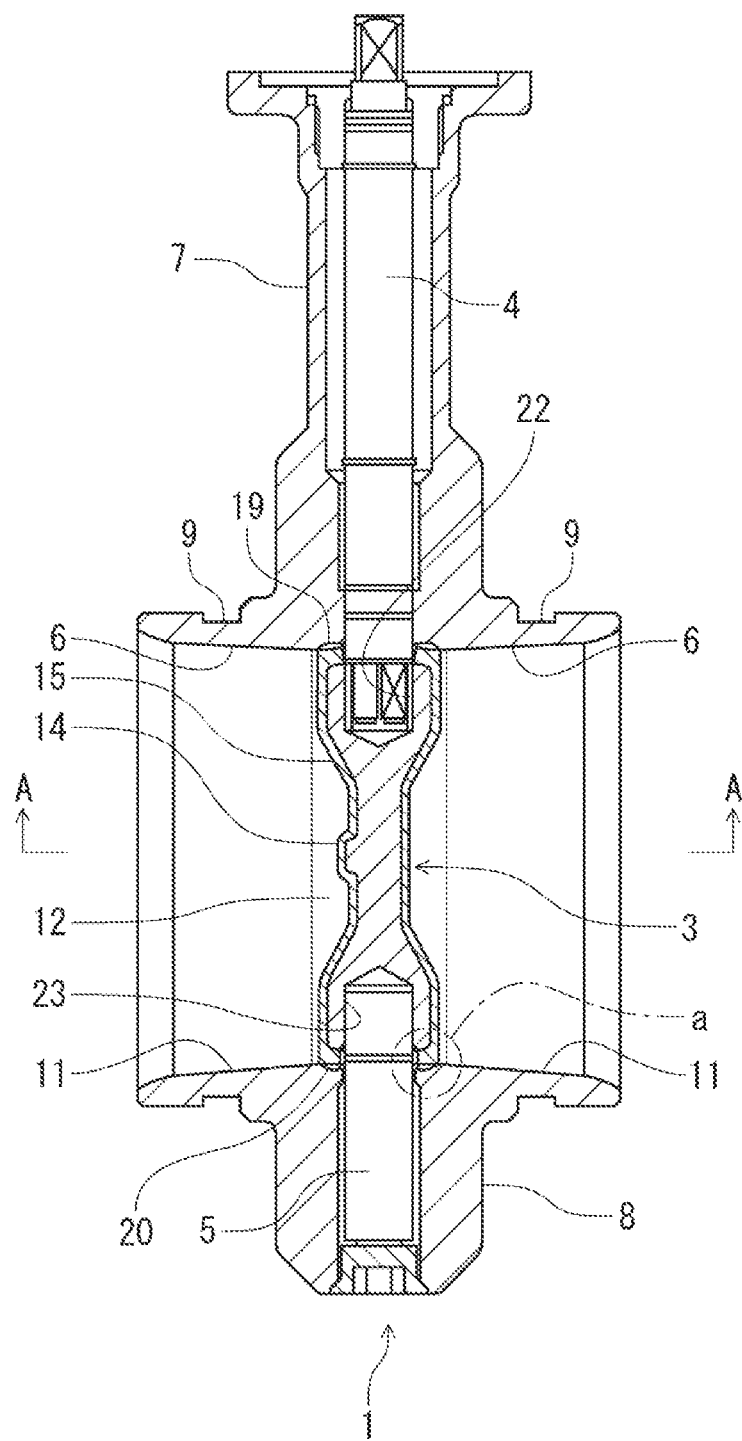
FIG. 2 is a longitudinal sectional view of the centric butterfly valve of FIG. 1 in a flow path direction.
Figure 3:
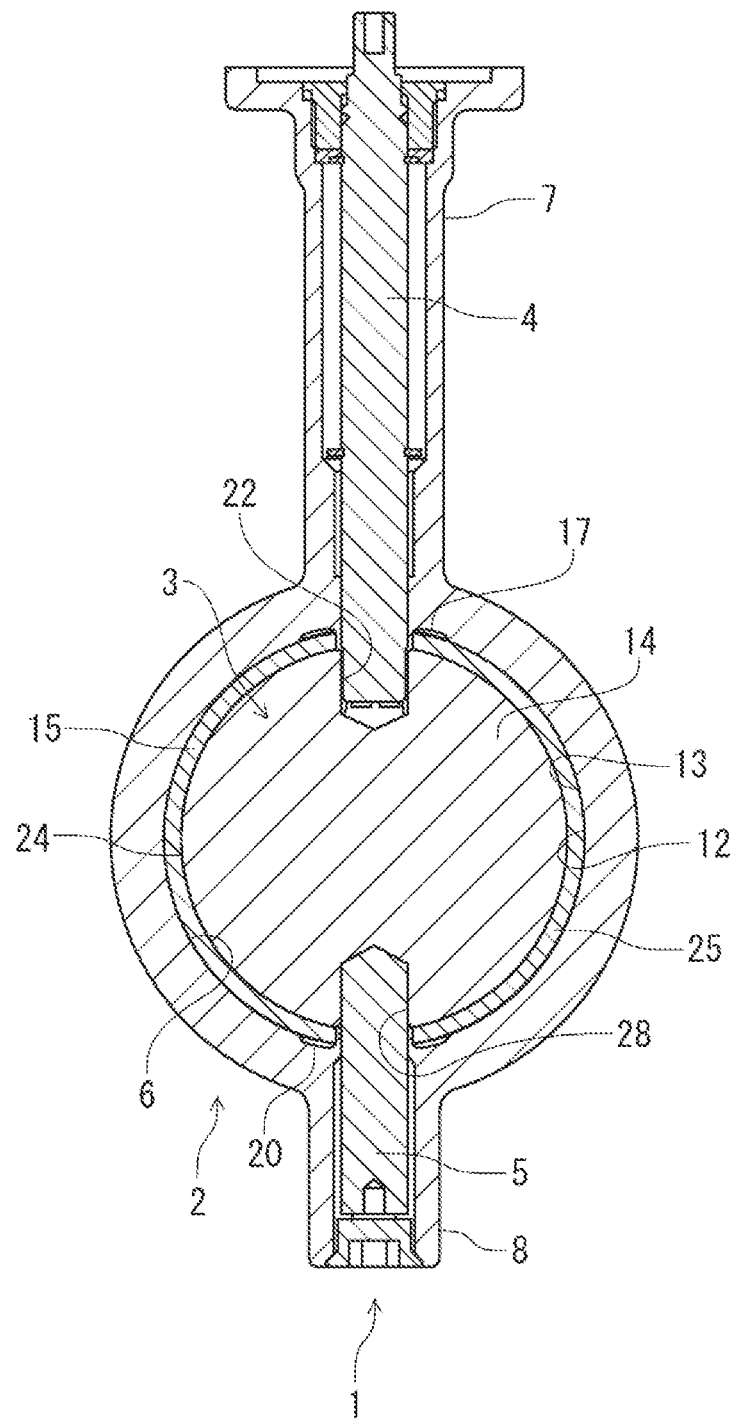
FIG. 3 is a longitudinal sectional view of the centric butterfly valve of FIG. 1 in a direction perpendicular to the flow path.

FIG. 1 is a perspective view depicting the outer appearance of a centric butterfly valve in the present invention, FIG. 2 is a longitudinal sectional view in a flow path direction, and FIG. 3 is a longitudinal sectional view in a direction perpendicular to the flow path.

In FIG. 1, FIG. 2, and FIG. 3, a centric butterfly valve (hereinafter referred to as a valve main body 1) has a cylindrical body 2, a valve disk 3, and an upper stem 4 and a lower stem 5.

The body 2 is integrally molded of cast iron, for example, ductile iron or the like. As depicted in FIG. 1 and FIG. 2, inside the body 2, a flow path 6 passing through the body 2 is provided. Outside the body 2, an upper stem-insertion barrel 7 having the upper stem 4 inserted therethrough is provided on an upper side, and a lower stem-insertion barrel 8 having the lower stem 5 inserted therethrough is provided on a lower side. Also, grooves (ditches) 9, 9 are each provided on an outer peripheral part of the body 2 on each of both end parts.

These grooves 9, 9 are provided similarly on plumbing sides, not depicted, which are connected to the valve main body 1. With the grooves on both sides tightly attached and fixed by a housing, not depicted, across the valve main body 1 and plumbing's connecting parts, thereby allowing connection (groove connection) between the valve main body 1 and the plumbing.

Note that while the groove connection scheme is adopted to reduce installation time in the present embodiment, the centric butterfly valve in the present invention is not limited to the groove connection scheme and can be applied also to other connection schemes such as a flange connection scheme.

FIG. 2 is a longitudinal sectional view in the direction along the flow path 6 of the valve main body 1, and FIG. 3 is a longitudinal sectional view in the direction perpendicular to the flow path 6 of the valve main body 1, both drawing depicting a fully-closed state. The valve disk 3 is arranged at the center position of the flow path 6 provided inside the body 2, above and below which the upper stem 4 and the lower stem 5 are inserted and rotatably provided. The flow path 6 has an inner peripheral surface 11 that has undergone only coating process or the like but not lining with rubber or the like.

Figure 4:
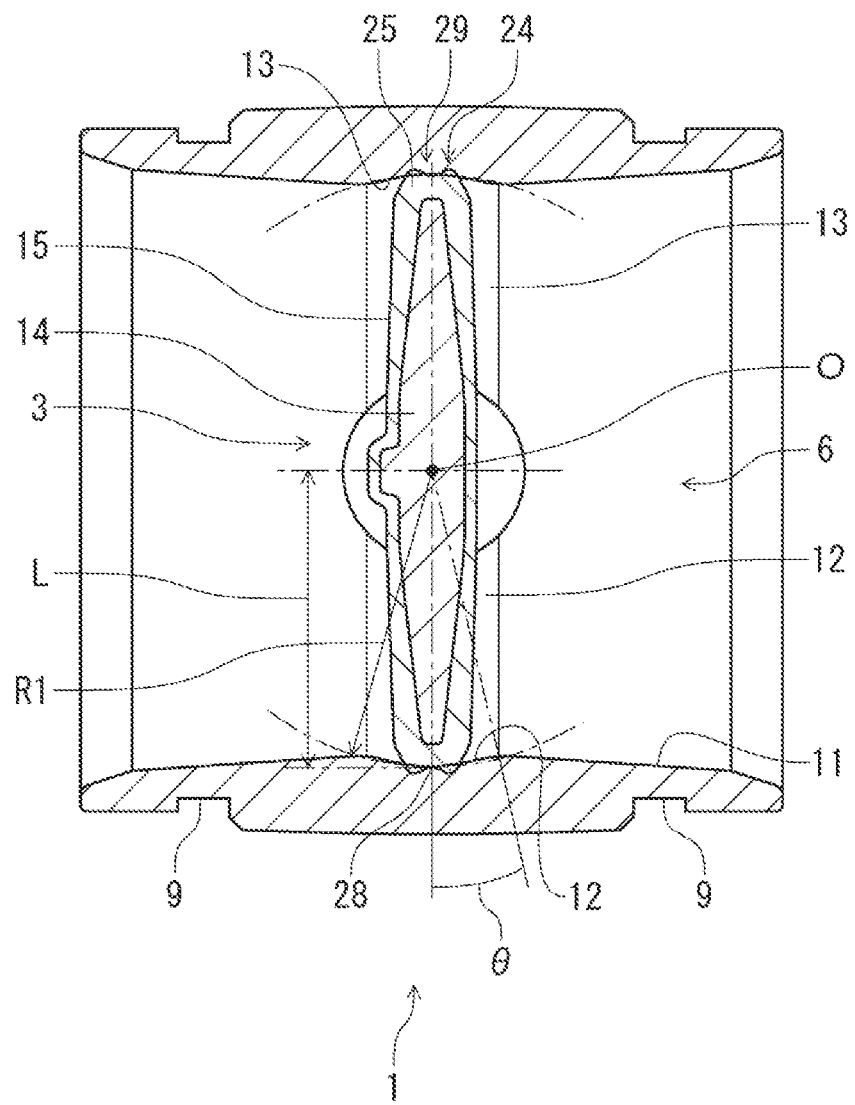
FIG. 4 is an A-A line sectional view of FIG. 2.

FIG. 4 is an A-A sectional view of FIG. 2, depicting a detailed shape of the flow path 6 provided inside the body 2. In FIG. 4, in the vicinity of the center of the inner peripheral surface 11 of the flow path 6, an arc surface 12 taking a center O of the valve disk 3 as a center and having a radius R1 is formed over the entire perimeter except portions into which the upper stem 4 and the lower stem 5 are inserted, configuring a seal surface 13 on a body 2 side.

In this manner, with the arc surface 12 formed on the inner peripheral surface 11 of the body 2, as will be described further below, top and bottom boss surfaces 19 and 20 each formed with its apex part formed as a spherical surface can be uniformly pressurized, and favorable sealability can be obtained in the top and bottom boss surfaces 19 and 20 of the valve disk 3.

Also, with the seal surface 13 formed by the arc surface 12 in the vicinity of the fully-closing position of the valve disk on the body 2 side, uniform surface pressure can be applied to an outer peripheral end 24 of the blade portion of the valve disk 3 within a range of this arc surface 12. Thus, even if the closed position of the valve disk 3 is slightly shifted from a fully-closed position, where the valve disk is perpendicular to the flow path direction, if that shift is within a range where the arc surface 12 is formed, it does not affect sealability and stable sealability can be obtained.

While the range of a formation angle θ of this arc surface 12 is preferably equal to larger than 10 percent (equal to or larger than 9 degrees) with respect to the operation angle of the valve disk 3, if the formation angle θ is increased, the valve diameter of the seal surface 13 formed on the arc surface 12 is narrowed to decrease a Cv value. Thus, the range is required to set in consideration of the allowable range of the Cv value. Also, if an integral-type body is adopted as in the present embodiment, it is required to consider also assembling the valve disk by being inserted from a bore part of the flow path.

Figure 5:
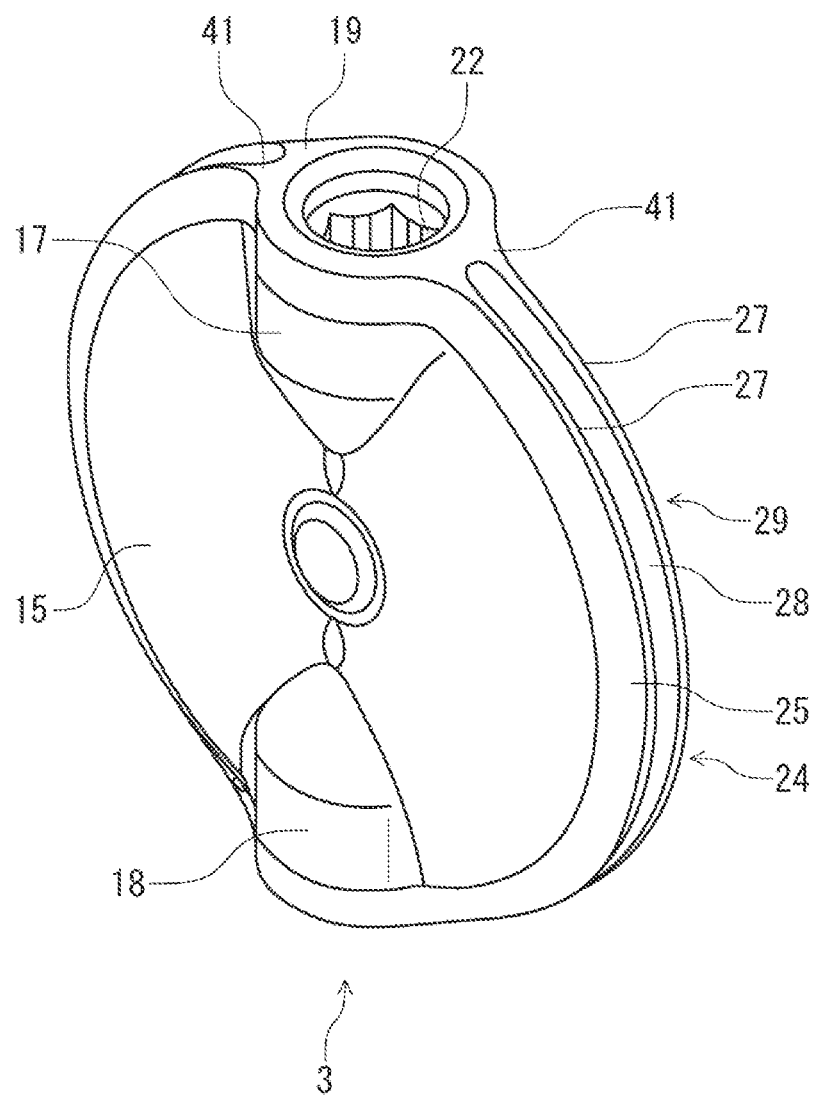
FIG. 5 is a perspective view depicting the outer appearance of a valve disk of the centric butterfly valve in the present invention.
Figure 7:
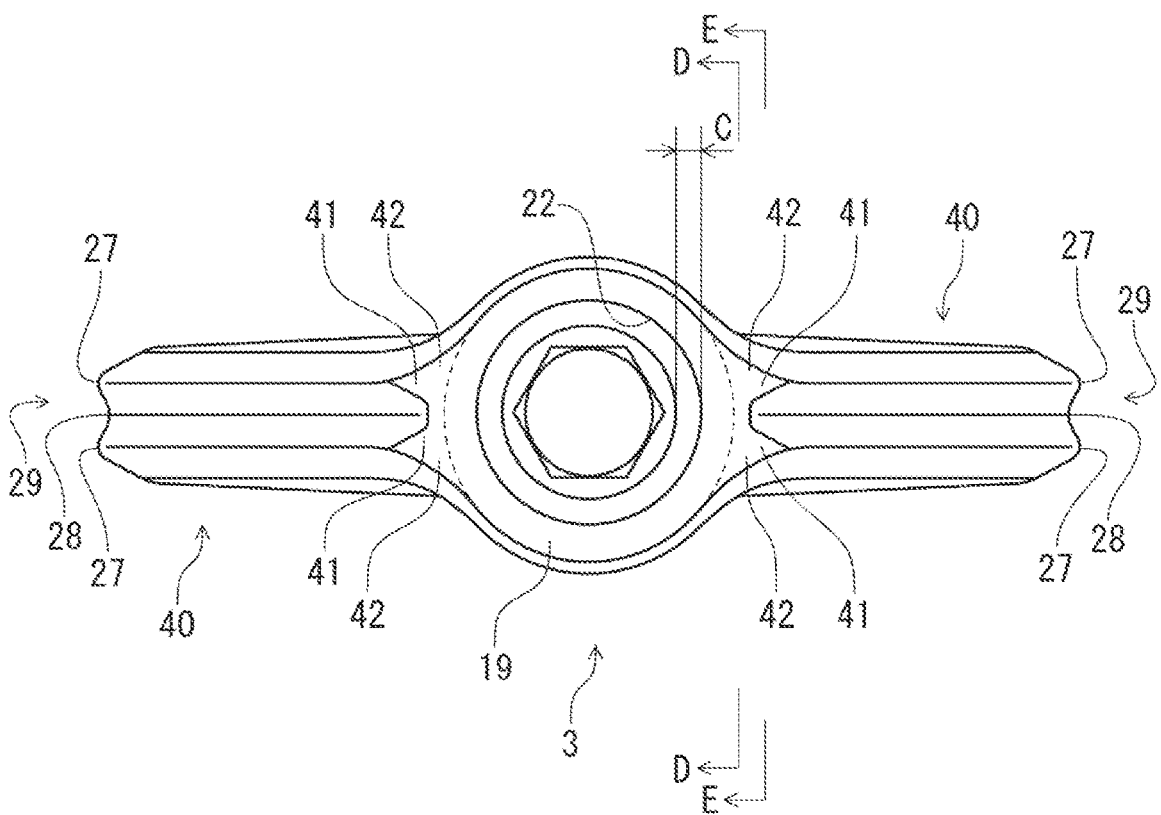
FIG. 7 is a plan view of the valve disk of FIG. 5.
Figure 8:
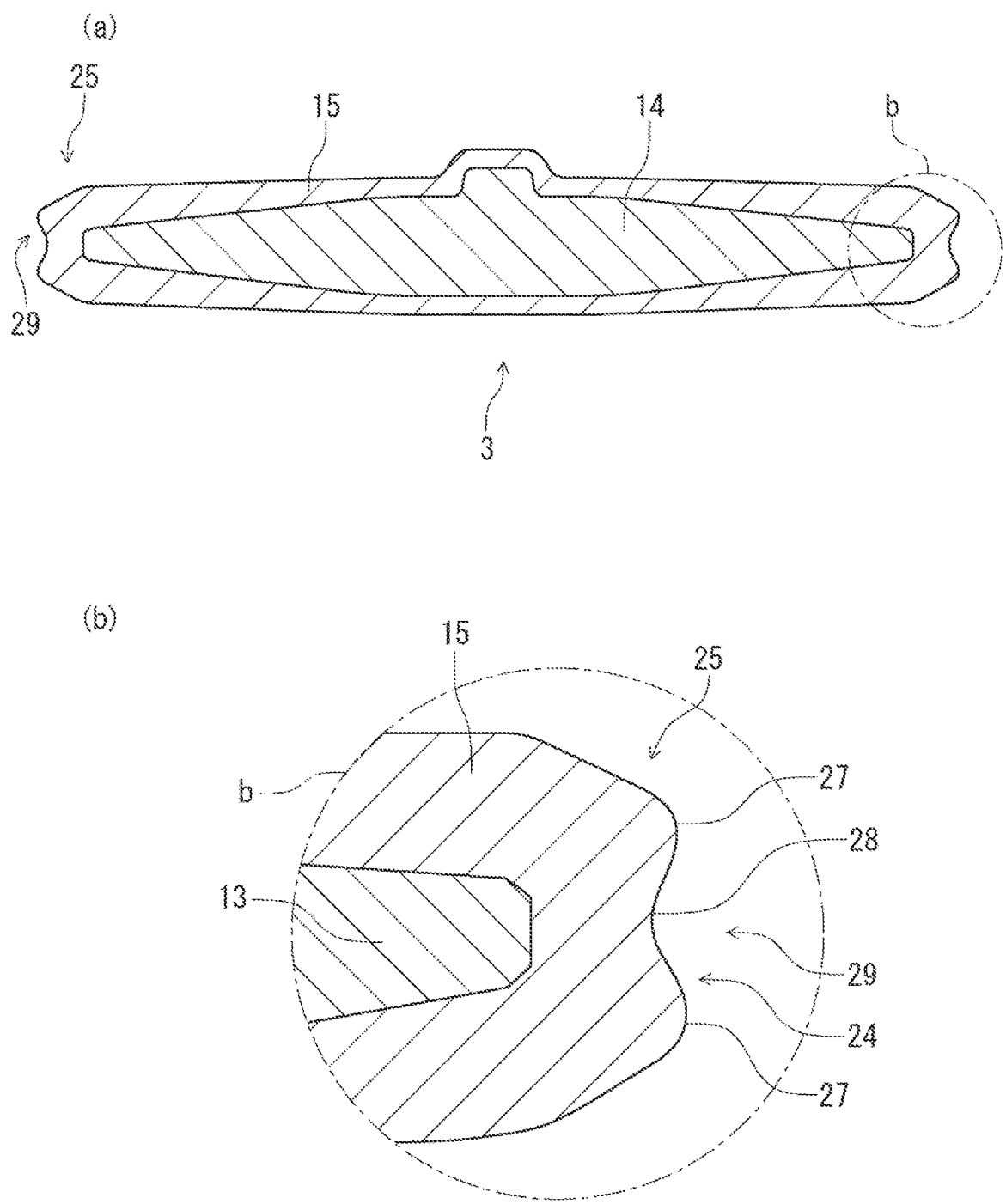
FIG. 8, (a) is a B-B line sectional view of the valve disk of FIG. 6 and (b) is an enlarged view of (a).

Next, the structure of the valve disk 3 is described in detail based on the drawings. FIG. 5 is a perspective view of the valve disk 3, FIG. 6 is a half-sectional view of the front of the valve disk 3, FIG. 7 is a plan view of the valve disk 3, and FIG. 8 is a B-B sectional view of FIG. 6.

Figure 6:
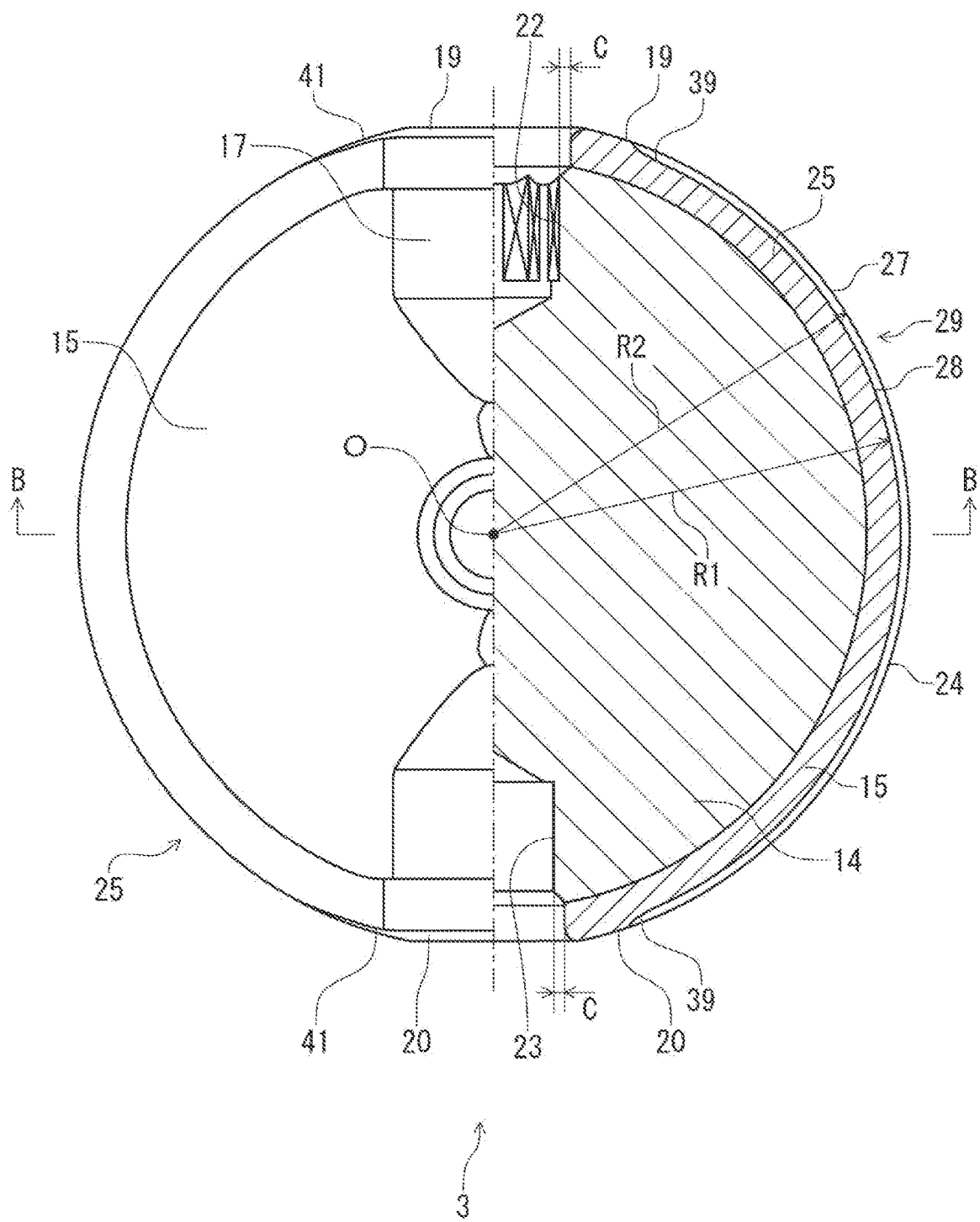
FIG. 6 is a front half-sectional view of the valve disk of FIG. 5.

The valve disk 3 is configured, as depicted in FIG. 5, FIG. 6, and FIG. 8(a), by coating the outer periphery of a core metal 14 with an elastic member 15. In this example, stainless steel is used for the core metal 14, and EPDM (ethylene propylene diene rubber) is used for the elastic member 15. Note that the valve disk 3 is not limited to a lining valve disk having the surface of the core metal coated with the elastic member in this manner, but may be, for example, one made entirely of metal. In that case, an elastic member for sealing or the like is provided on the seal surface on a body side. However, what is different is merely that the elastic member provided not on a valve disk side but on a body side is crushed by pressure at the time of valve closing or the like, and the shape of the valve disk of the present invention allows a similar effect to be obtained.

On upper and lower parts of the valve disk 3, a top-side boss part 17 and a bottom-side boss part 18 are formed. The top boss surface 19 of the top-side boss part 17 and the bottom boss surface 20 of the bottom-side boss part 18 are each formed in a spherical shape. Also, the top-side boss part 17 is provided with an upper-stem insertion hole 22 into which the upper stem 4 is inserted, and the bottom-side boss part 18 is provided with a lower-stem insertion hole 23 into which the lower stem 5 is inserted.

On the outer peripheral end 24 of the blade portion of the valve disk 3, an outer peripheral seal part 25 is formed of the elastic member 15. As depicted in FIG. 7 and FIG. 8(a), this outer peripheral seal part 25 is provided with an M-shaped section part 29 formed by smoothly linking two round-shaped apex parts 27, 27 and a round-shaped valley-bottom part 28.

In this manner, with the outer peripheral seal part 25 of the M-shaped section part 29 provided to the valve disk outer peripheral end 24, two linear seal parts by the apex pars 27, 27 are linearly formed in parallel with the entire perimeter of the valve disk outer peripheral end 24 at the time of valve closing. Of these, in particular, on the linear seal part positioned on a primary side, the load of the fluid pressure concentrates, and thereby high seal surface pressure occurs. Thus, favorable sealability can be obtained.

Also, the two linear seal parts linearly formed in parallel of the two apex parts 27, 27, of the M-shaped section part 29 are formed over the entire perimeter of the outer peripheral end 24 of the blade portion of the valve disk 3 equidistantly from the center O of the valve disk. Thus, at the fully-closed position, the outer peripheral end 24 of the blade portion of the valve disk 3 is pressured by the seal surface 13 formed in an arc surface shape, and thereby a uniform surface pressure acts on the outer peripheral seal part 25 of the valve disk 3. Thus, favorable sealability can be obtained.

Furthermore, together with valve opening and closing, the outer peripheral seal part 25 of the valve disk 3 is repeatedly pressurized and, in particular, the vicinity of the valley-bottom part 28 repeatedly receives compressive force. However, since the outer peripheral end of the outer peripheral seal part 25 takes the M-shaped section part 29 with the round-shaped apex parts 27, 27 and the round-shaped valley-bottom part 28 smoothly linked, the occurrence of stress concentration can be suppressed. Thus, the occurrence of a starting point of rupture can be prevented, and durability of the outer peripheral seal part 25 can be improved.

Also, as depicted in FIG. 8(b), vicinities of the two linear apex parts 27, 27 of the M-shaped section part 29 have roundness dimensions substantially equal to each other, and the roundness dimension of the valley-bottom part 28 is formed in a range on the order of ½ to twice as large as the roundness dimensions in the vicinities of the apex parts 27, 27.

In this manner, with the roundness dimensions of the apex parts 27, 27 and the valley-bottom part 28 of the M-shaped section part 29 of the outer peripheral seal part 25 formed in a range so as to be close to each other, stress occurring in the M-shaped section part 29 at the fully-closed position can be effectively dispersed. Thus, the occurrence of stress concentration in the outer peripheral seal part 25 can be suppressed, and durability of the outer peripheral seal part 25 can be improved.

Described further in detail below are effects of providing the M-shaped section part 29 to the outer peripheral seal part 25 to configure parallel two linear seal parts in the above-described manner in the centric butterfly valve of the present invention.

Figure 9:
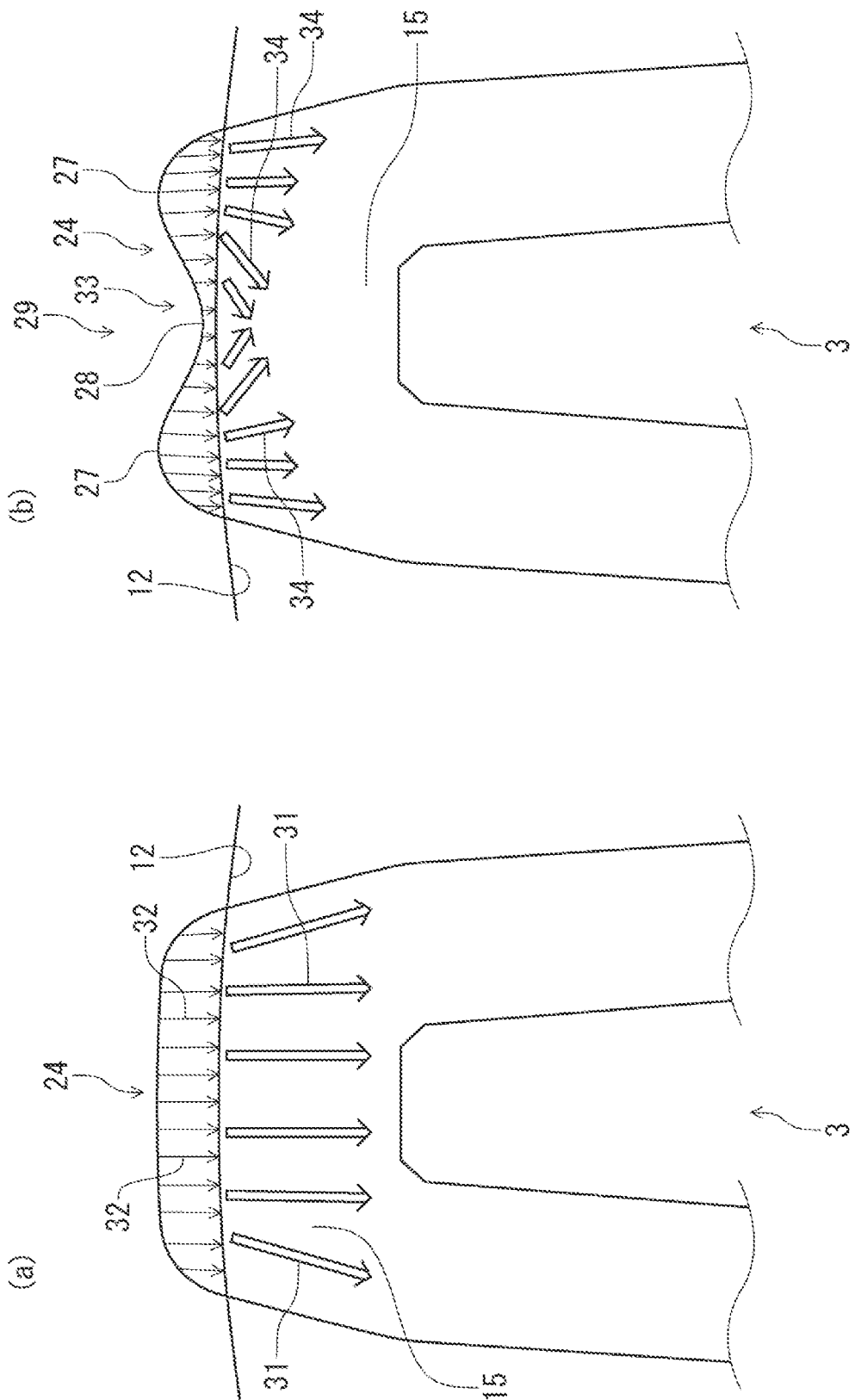
FIG. 9 is a view schematically depicting the magnitude of surface pressure acting on an outer peripheral seal part from a seal surface of a body and a displacement direction of an elastic member at a fully-closed position of the centric butterfly valve in the present invention.

FIG. 9 is a diagram schematically depicting how the surface pressure is applied to the outer peripheral seal part 25 and a displacement direction of the elastic member 15 of the outer peripheral seal part 25 when the outer peripheral end 24 of the blade portion of the valve disk 3 is pressurized by the arc surface 12 at the fully-closed position, in which (a) depicts the case of an outer peripheral seal part, the outer peripheral seal part being in a conventional single convex structure, and (b) depicts the case of an outer peripheral seal part provided with an M-shaped section part.

In the case of the conventional valve disk having an outer peripheral seal part in a single convex structure depicted in (a), when the valve disk 3 reaches the closed position, a portion of the elastic member 15 protruding from the arc surface 12 of the body 2 is crushed by the arc surface 12. Here, since the crushed elastic member 15 is pushed substantially as it is in a direction in which pressure is applied, as indicated by white arrows 31, the rubber moves in a chained manner from the outer peripheral end 24 of the blade portion of the valve disk 24 toward a direction of the center of the valve disk 3. Also, since the single convex part is crushed, a substantially uniform surface pressure acts from the arc surface 12 of the body 2, as indicated by black arrows 32.

By contrast, in the structure depicted in (b) with the outer peripheral seal part provided with the M-shaped section part 29, even when the elastic member 15 of the outer peripheral end of the blade portion of the valve disk 24 is crushed by the arc surface 12 with the valve disk 3 being at the fully-closed position, a space 33 is present at the valley-bottom part 28 between the two apex parts 27, 27 of the M-shaped section part 29. Thus, in addition to a small movement amount of the elastic member 15 by the volume of the space 33, the elastic member 15 can easily move to a direction of this space 33, as indicated by white arrows 34, and thus the movement of the elastic member 15 to the direction of the center of the valve disk 3 is suppressed. Also, while the apex parts 27, 27 of the M-shaped section part 29 are crushed approximately straight, the moving directions of other portions of the elastic member 15 tend to be dispersed, and thus the surface pressure tends to concentrate on the apex parts of the M-shaped section part 29, as indicated by black arrows 35. As a result, over the entire periphery of the valve disk outer peripheral end 24, two linear seal parts are formed by the apex parts 27, 27 of the M-shaped section part 29. Thus, favorable sealability can be exerted at the time of valve closing.

Also, as described above, of these two linear seal parts, loads are further applied to the seal part positioned on an upstream side by the fluid pressure acting on the valve disk at the time of valve closing. Thus, the seal surface pressure is increased more to improve sealability.

Figure 10:
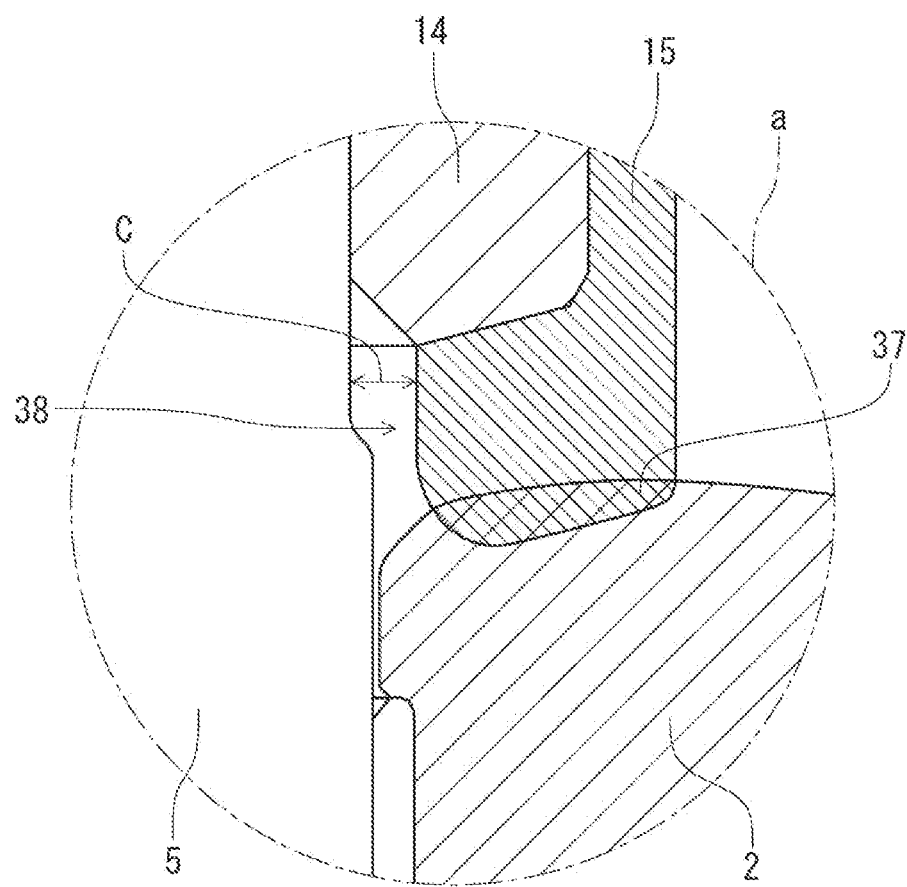
FIG. 10 is an enlarged view of a part of the centric butterfly valve of FIG. 2.

As depicted in FIG. 6 and FIG. 7, on the upper and lower parts of the valve disk 3, a gap C is provided to the outer periphery of the upper stem 4 and the lower stem 5 to cover the elastic member 15. FIG. 10 is an enlarged view of a part of FIG. 2, depicting a state in which the gap C is provided on the outer periphery of the lower stem 5. While this drawing depicts a situation of the bottom-side boss part 18 of the valve disk 3, the gap C is provided similarly also to the top-side boss part 17 of the valve disk 3.

In this manner, the reason why the gap C is provided on the outer periphery of each of the upper stem 4 and the lower stem 5 is to provide a space to which the elastic member 15 covering the top and bottom boss surfaces 19 and 20 of the valve disk 3 can escape (move) when pressurized by the inner peripheral surface 11 of the body 2. In the centric butterfly valve, when the valve disk 3 is attached inside the body 2, the top and bottom boss surfaces 19 and 20 of the valve disk 3 are always pressurized by the inner peripheral surface 11 of the body 2. Thus, the elastic member 15 covering the top and bottom boss surfaces 19 and 20 is crushed to cause an increase in surface pressure. This increase in surface pressure increases open/close operation torque. For this reason, by providing the gap C on the outer periphery of each of the upper stem 4 and the lower stem 5, a space 38 is set to which this crushed portion (in FIG. 10, a portion where a hatched area indicating a cross section of the elastic member 15 and a hatched area indicating a cross section of the body 2 cross) 37 of the elastic member 15 can escape (move). If so, the crushed portion 37 of the elastic member 15 can escape to this space 38, and thus the surface pressure of the elastic member 15 covering the top and bottom boss surfaces 19 and 20 does not become excessively high and an increase in open/close operation torque can be suppressed.

Next, the overall shape of the valve disk 3 is described. As depicted in FIG. 6, the top and bottom boss surfaces 19 and 20 configuring the overall shape of the valve disk 3 and the apex parts 27, 27 of the M-shaped section part 29 are part of a spherical surface formed to have a substantially equal radius R2 from the center O of the valve disk 3, except the portions provided with the upper-stem insertion hole 22 and the lower-stem insertion hole 23 and the portion of the space C provided on the outer periphery of each of the upper stem 4 and the lower stem 5. That is, the overall shape of the valve disk 3 is as if it is substantially identical to a disc cut out from a sphere having the radius R2 by positioning the center of the sphere at its center.

Also, it is formed that a distance L from the center O of the valve disk 3 to the valley-bottom part 28 of the M-shaped section part 29 is substantially equal to the radius R1 of the seal surface 13 formed by the arc surface 12 provided on the inner peripheral surface 11. Therefore, the radius of the valley-bottom part 28 of the M-shaped section part 29 has a "zero-zero positional relation", in which the radius is substantially equal to the radius of the seal surface 13 configured in the flow path 6 of the body 2 by the arc surface 12.

Other than this, with the top and bottom boss surfaces 19 and 20 of the valve disk 3 and the valley-bottom part 28 of the M-shaped section part 29 being connected with mild tilted surfaces 39, 39, the occurrence of stress concentration when the top and bottom boss surfaces 19 and 20 are pressurized by the arc surface 12 of the body 2 is prevented.

In this manner, with the radius of the seal surface 13 provided to the body 2 being substantially equal to the radius of the valley-bottom part 28 of the M-shaped section part 29 provided to the outer peripheral seal part 25 of the valve disk, the movement amount of the elastic body 15 of the valley-bottom part 28 occurring by being pressurized by the seal surface 13 at the time of valve closing can be minimized (or brought to zero). In addition, the portions of the apex parts 27 pressurized and crushed by the seal surface 13 can be let escape to a direction of this valley-bottom part 28, thereby less affecting other portions, preventing excessive stress from occurring in the outer peripheral seal part 25, and allowing suppression of an increase in open/close operation torque of the valve.

In addition to this, as depicted in FIG. 7, an extended part 41 is provided from the top boss surface 19 toward a blade portion 40 side and, by this extended part 41, the top boss surface 19 and the apex parts 27 of the M-shaped section part 29 of the valve disk outer peripheral end 24 are smoothly connected. Similarly, the extended part 41 is provided also from the bottom boss surface 20 toward the blade portion 40 side to smoothly connect the bottom boss surface 20 and the apex parts 27 of the M-shaped section part 29 of the valve disk outer peripheral end 24.

Here, the shape of the extended part 41 is described in detail by taking the top boss surface 19 side as an example, but the same goes for the bottom boss surface 20 side. The top boss surface 19 has a spherical surface provided around the upper-stem insertion hole 22. Since this top boss surface 19 is successively linked to the valve disk outer peripheral end 24, there is no clear boundary. Here, however, a circle having an outer perimeter including a portion of the top boss surface 19 bulging from the thickness of the valve disk 3 is assumed, and a spherical part in an area inside this circle (an area limited to a portion indicated by a broken line in FIG. 7) is taken as the top boss surface 19. The extended part 41 refers to a portion formed by extending the spherical surface of the top boss surface 19 over the area inside this circle (broken-line portion) to the valve disk outer peripheral end 24 side.

In an embodiment depicted in FIG. 7, the extended part 41 is formed to be termination end parts that are the longest on a blade portion side at the positions of the two apex parts 27, 27 of the M-shaped section part 29 of the valve disk outer peripheral end 24 so that the width is gradually narrower toward each of these two termination end parts. Also in this embodiment, the two termination end parts of the extended part 41 on the blade portion side are linked therebetween to form a shape as being smoothly rounded.

In this manner, by providing the extended part 41, the top and bottom boss surface 19 and 20 and the valve disk outer peripheral end 24 are successively linked. Thus, at the fully-closed position, the elastic member 15 covering from the top and bottom boss surface 19 and 20 to the apex parts 27 of the M-shaped section part 29 of the valve disk outer peripheral end 24 is uniformly crushed, and thereby a portion which leads to leakage or the like hardly occurs and sealability around the stems is improved. If it is assumed that no extended part 41 is provided and the valve disk outer peripheral end 24 is directly linked to the top and bottom boss surfaces 19 and 20, the top and bottom boss surfaces 19 and 20 and the two apex parts 27, 27 of the M-shaped section part 29 of the valve disk outer peripheral end 24 have the same height, but surface sealing by the top boss surface 19 is abruptly switched to linear shealing by the two apex parts 27, 27 at a boundary portion with the valve disk outer peripheral end 24, and thus the surface pressure is changed at this boundary portion to possibly lead to leakage. According to the extended part 41, surface sealing of the top and bottom boss surfaces 19 and 20 is smoothly switched to linear sealing of the apex parts 27, 27. Thus, the sealing structure is not abruptly changed, and leakage at the boundary portion hardly occurs.

Furthermore, the extended part 41 also has a successive part 42 linked from the outer periphery of the top boss surface 19 toward the apex part 27 of the M-shaped section part 29 of the blade portion of the valve disk 40. This successive part 42 is provided so as to be gradually narrower toward the apex part 27. According to this successive part 42, the top boss surface 19 is extended not only to an area interposed between the apex parts 27 of the M-shaped section part 29 of the blade portion of the valve disk 40 but the top boss surface 19 is extended to a portion outside the area interposed between the apex parts 27. Also, similarly, the successive surface 42 is formed from a side part of the bottom-side boss part 18 to the apex part 27 of the M-shaped section part 29 of the blade portion of the valve disk 40.

In this manner, by providing the successive surface 42, the top and bottom boss surfaces 19 and 20 are extended not only to the portion interposed between the two apex parts 27, 27 of the outer peripheral end of the blade portion of the valve disk 24 but also to the outside of these. Thus, the sealing structure can be gradually changed from the top and bottom boss surfaces 19 and 20 toward the outer peripheral end 24 of the blade portion of the valve disk 24. Thus, the occurrence of leakage based on discontinuity of sealing at their boundary portions can be more reduced.

Figure 11:
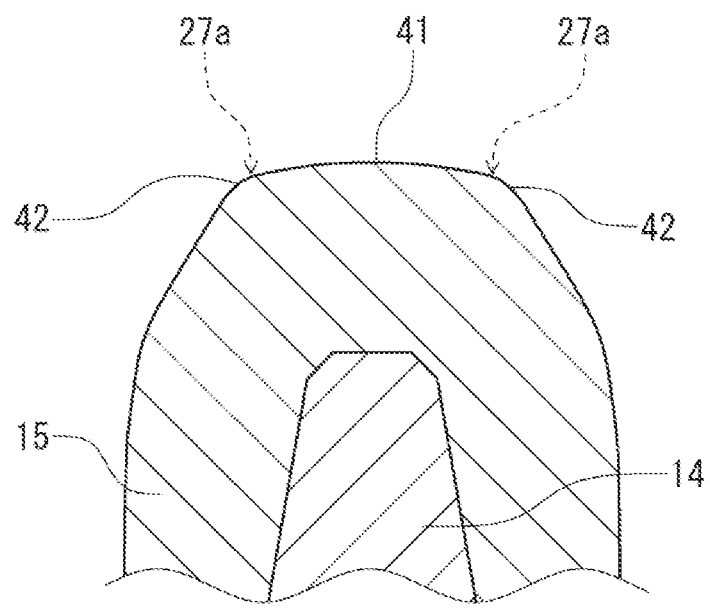
In FIG. 11, (a) is an enlarged end face view of a D-D line portion of the valve disk of FIG. 7 and (b) is an enlarged end face view of an E-E line portion of the valve disk of FIG. 7.
Figure 11:
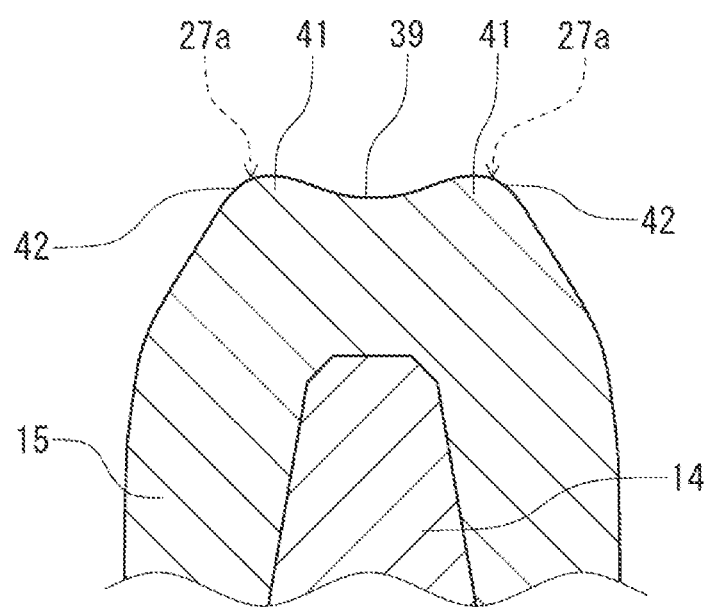

To describe the structure of the extended part 41 further in detail, a D-D line enlarged end face view of FIG. 7 and a E-E line enlarged end face view of FIG. 7 are depicted in (a) and (b) of FIG. 11, respectively. In FIG. 11(a), an upper part in the drawing is the extended part 41 extended from the spherical surface of the top boss surface 19, and positions indicated by broken arrows 27a are the positions of the heights corresponding to the apex parts 27, 27 of the M-shaped section part 29. An area outside these apex parts 27, 27 in the extended part 41 corresponds to the successive surface 42. FIG. 11(b) depicts the structure of a portion formed by the extended part 41 branched toward the two apex parts 27, 27 in the vicinity of the outer peripheral end of the blade portion of the valve disk. In this manner, in the line, the upper surface of the extended part 41 is also in a substantially M shape, and portions indicated by the broken arrows 27a are the positions of the heights corresponding to the apex parts 27, 27 of the M-shaped section part 29. Also, the valley-bottom part 28 between the two apex parts 27, 27 corresponds to the tilted surfaces 39, and an area outside these apex parts 27, 27 in the extended part 41 corresponds to the successive surface 42.

Figure 12:
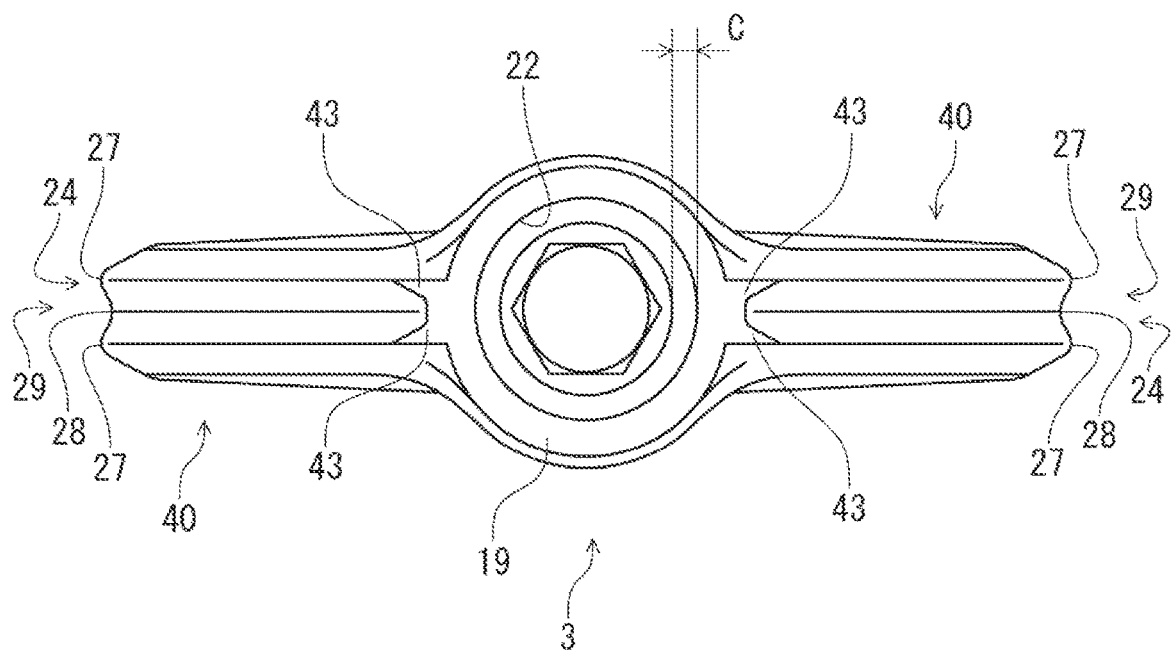
FIG. 12 is a plan view of a valve disk of another embodiment of the centric butterfly valve in the present invention.

Next, another embodiment of the centric butterfly valve of the present invention is described based on FIG. 12. The only difference between this other embodiment and the embodiment depicted in FIG. 1 to FIG. 9 is the shape of the extended part smoothly connecting the top and bottom boss surfaces 19 and 20 of the valve disk 3 and the apex parts 27, 27 of the M-shaped section part 29 of the valve disk outer peripheral end 24, and the other portions are identical. Therefore, in the following, only this difference in the extended part is described.

Since the shape of the extended part connecting the top and bottom boss surfaces 19 and 20 and the apex parts 27, 27 of the M-shaped section part 29 of the valve disk outer peripheral end 24 is identical, FIG. 12 depicts a plan view (a top boss surface side) of the valve disk for description. As depicted in FIG. 12, as for the top boss surface 19, an extended part 43 is provided from a valley-bottom part 28 side to the apex parts 27, 27 of the M-shaped section part 29 of the outer peripheral end of the blade portion of the valve disk 24 to extend the top boss surface 19, but the top boss surface is not extended from a side surface side of the valve disk 3 to the apex parts 27, 27. That is, this embodiment does not have the successive surface 42 depicted in FIG. 7 and FIG. 11.

In this manner, even if the extended part 43 is provided only one side of the apex parts 27, 27, the top and bottom boss surfaces 19 and 20 and the apex parts 27, 27 of the M-shaped section part 29 of the outer peripheral end of the blade portion of the valve disk 24 are successively linked. Therefore, when pressurized by the seal surface 13, the elastic member 15 covering the valve disk 3 is uniformly crushed from the top and bottom boss surfaces 19 and 20 to the outer peripheral end of the blade portion of the valve disk 24, and thereby a portion which leads to leakage or the like hardly occurs and sealability around the stem is improved.

The operating situation when the above-configured centric butterfly valve closes and effects of providing the M-shaped section part 29 to the outer peripheral seal part 25 of the valve disk 3 are described with the drawings.

FIG. 13(a) to FIG. 13(c) depict a positional relation between the valve disk 3 and the arc surface 12 (seal surface 13) provided to the flow path 6 in the vicinity of the fully-closed position. The valve disk 3 rotates to the fully-closed position in the order of (a), (b), and then (c). As depicted in the drawings, at the fully-closed position of the inner peripheral surface 11 of the body 2, the arc surface 12 is formed as the seal surface 13. As described above, the radius R1 taking the center O of the valve disk forming this arc surface 12 as a center and the distance L from the center O of the valve disk 3 to the valley-bottom part 28 of the M-shaped section part 29 are substantially equal.

FIG. 13(a) depicts a state in which the valve disk 3 has approached the fully-closed position. First, one side of the apex parts 27 of the M-shaped section part 29 makes contact with the arc surface 12 on the inner periphery of the body 2. With this contact, the apex part 27 on one side of the M-shaped section part 29 is crushed, and the elastic member of this crushed portion is pushed out mainly to the valley-bottom part 28 of the M-shaped section part 29. Thus, the movement of the elastic member 15 covering the surface of the valve disk 3 is limited to the vicinity of the outer peripheral end of the blade portion of the valve disk 24, and displacement of the elastic member 15 as the whole valve disk 3 is suppressed. Thus, an increase in surface pressure of the elastic member 15 is small, and the open/close operation torque hardly increases.

(b) depicts a state in which the valve disk 3 has further approached the fully-closed position, the state in which the entire outer peripheral end 24 of the blade portion of the valve disk 24 is in contact with the arc surface 12 of the body 2, both of the apex parts 27, 27 of the M-shaped section part 29 are crushed by the arc surface 12, and the valley-bottom part 28 is substantially in contact with the arc surface 12. The elastic member 15 at the crushed portions of the apex parts 27, 27 easily moves to the direction of the space 38 that is present between the two apex parts 27, 27 of the M-shaped section part 29 to prevent the surface pressure of the elastic member 15 of the M-shaped section part 29 of the outer peripheral seal part 25 from excessively increasing, thereby allowing suppression of an increase in the open/close operation torque.

(c) depicts a state in which the valve disk 3 has eventually reached the fully-closed position. The positional relation between the valve disk 3 and the arc surface 12 is substantially the same as the case depicted in (b), because the radius R1 of the arc surface 12 and the distance L between the valley-bottom part 28 and the center of the valve disk are substantially equal. Thus, as with the case depicted in (b), influences on the other portions by the apex parts 27, 27 of the M-shaped section part 29 being crushed by the arc surface 12 are small, and displacement of the elastic member 15 in the outer peripheral seal part 25 as a whole is suppressed. Thus, an increase in surface pressure of the elastic member 15 is small, and the open/close operation torque does not significantly increase.

In the conventional butterfly valve, there is a problem of an abrupt increase in operation torque immediately before valve closing. In the centric butterfly valve of the present invention, with the M-shaped section part 29 provided to the outer peripheral seal part 25, as described above, an abrupt increase in open/close operation torque immediately before valve closing can be suppressed.

Figure 13:
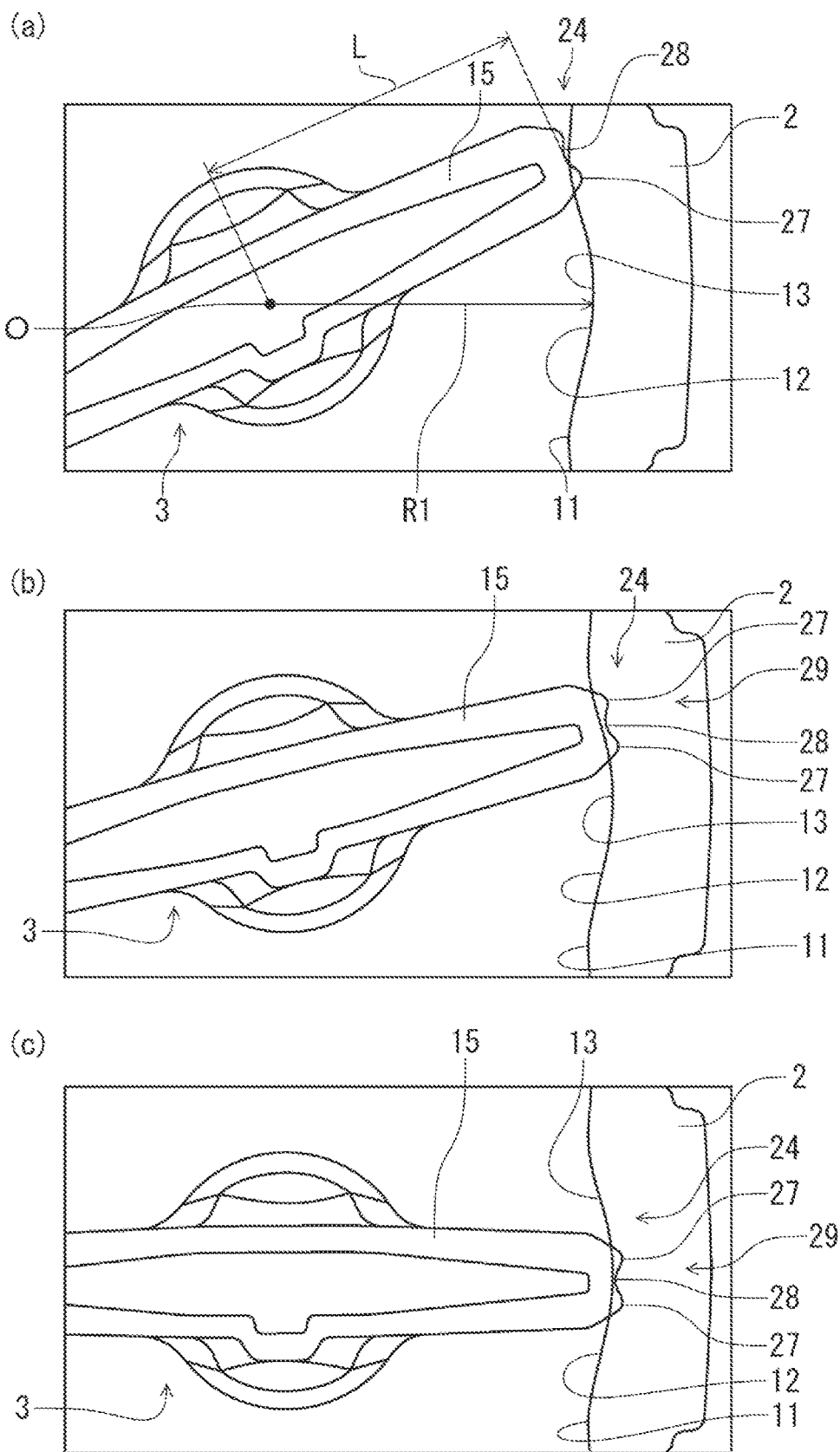
FIG. 13 is a drawing for describing an actuation situation of the centric butterfly valve in the present invention at the time of valve closing and an effect of providing an M-shaped section part to an outer peripheral seal part of the valve disk.

Also, with the seal surface 13 of the body 2 configured of the arc surface 12, as can be found from (b) and (c) of FIG. 13, if the stop angle of the valve disk 3 when operated to the fully-closed position is not vertical to the flow path 6 but as long as the valve disk 3 stops in a range of formation of the arc surface 12, stable sealability can be obtained.

As has been described in the foregoing, in the centric butterfly valve of the present invention, the seal part 13 of the arc surface 12 is provided to the flow path 6 formed in the body 2, the outer peripheral seal part 25 including the M-shaped-section structural part 29 at the outer peripheral end 24 of the blade portion of the valve disk 3 is provided, and the top and bottom boss surfaces 19 and 29 of the valve disk 3 are configured to have a spherical shape. Thus, the outer peripheral end 24 of the blade portion of the valve disk 3 is pressurized by the seal surface 13 at the time of valve closing from the entire circumferential direction with a uniform surface pressure, and the pressure force concentrates on the apex parts 27, 27 of the M-shaped-section structural part 29 to form two parallel linear seal surfaces. Thus, favorable sealability can be obtained.

In addition to this, the top and bottom boss surfaces 19 and 20 are successively and slightly extended to the blade portion 40 side to provide the extended part 41 which smoothly connects the apex parts 27 of the M-shaped section part 29 of the outer peripheral seal part 25. Thus, the top and bottom boss surfaces 19 and 20 and the outer peripheral end 24 of the blade portion of the valve disk are successively linked. At the time of valve closing, the elastic member 15 covering the valve disk 3 from the top and bottom boss surfaces 19 and 20 to the outer peripheral end of the blade portion of the valve disk 24 is uniformly crushed to cause a seal part to occur seamlessly. Thus, sealability around the stems can be improved.

Also, with the gap C not covering the elastic member 15 provided on the outer periphery of each of the upper stem 4 and the lower stem 5 of the valve disk 3, is provided, to which the crushed portion of the elastic member 15 occurring as the top and bottom boss surfaces 19 and 20 are pressurized when the valve disk 3 is attached to the body 2 can escape and obtain, and the outer peripheral seal part 25 is configured so that the crushed portion of the elastic member 15 of the apex parts 27, 27 of the M-shaped-section structural part 29 pressurized by the seal surface 13 at the time of valve closing can escape to the space 33 of the valley-bottom part 28, thereby preventing excessive stress from occurring in the elastic member 15 of the outer peripheral seal part 25 and allowing suppression of an increase in open/close operation torque.

Furthermore, with the roundness dimensions of the apex parts 27, 27 and the valley-bottom part 28 of the M-shaped section part 29 of the outer peripheral seal part 25 formed in a range so as to be close to each other, stress occurring in the M-shaped section part at the time of valve closing can be effectively dispersed. Also, with the top and bottom boss surfaces 19 and 20 and the valley-bottom part 28 of the M-shaped section part 29 of the outer peripheral seal part 25 linked by the mild tilted surfaces 39, 39 and with the side parts of the top-side and bottom-side boss parts 17 and 18 to the apex parts 27 of the M-shaped section part 29 of the blade portion of the valve disk 40 linked by the successive surface 42, the occurrence of stress concentration on the elastic member 15 of an outer peripheral seal part 25 is suppressed, and durability of the outer peripheral seal part 25 is improved.

In this manner, the centric butterfly valve of the present invention has favorable sealability and small open/close operation torque, and is excellent in durability, and thus can be widely used in various scenes, such as water supply and drainage, air-conditioning facilities, and factory processes.

REFERENCE SIGNS LIST 1 valve main body
2 body
3 valve disk
4 upper stem
5 lower stem
11 inner peripheral surface
12 arc surface
14 core metal
15 elastic member
19 top boss surface
20 bottom boss surface
24 outer peripheral end of the blade portion of the valve disk
25 outer peripheral seal part
27 apex part
28 valley-bottom part
29 M-shaped section part

The invention claimed is:
1. A centric butterfly valve comprising:
a cylindrical valve body;
a valve disk rotatably provided inside the cylindrical valve body via upper and lower stems, the valve disk having a blade portion, top and bottom boss surfaces on upper and lower parts of the blade portion, and an outer peripheral seal part at an outer peripheral end of the blade portion, wherein the outer peripheral seal part is an M-shaped section part having two linear round-shaped apex parts positioned on a primary side and a secondary side of the valve disk, and a round-shaped valley-bottom part between and smoothly linking the apex parts, wherein, in a fully-closed state of the valve disk, the two linear apex parts are crushed and portions thereof move in a direction of a space of the at the valley-bottom part to form two linear seal parts by the apex parts, wherein an inner peripheral surface of the valve body has a seal surface formed of an arc surface and, when the outer peripheral end of the blade portion of the valve disk makes contact with the arc surface of the body, the valley-bottom part of the M-shaped section part becomes in a state of being substantially in contact with the arc surface.

2. The centric butterfly valve according to claim 1, wherein
the two linear apex parts of the M-shaped section part have roundness dimensions substantially equal to each other, and the valley part has a roundness dimension in a range on order of ½ to twice as large as the roundness dimensions of the two linear apex parts.

3. The centric butterfly valve according to claim 1, wherein
the top and bottom boss surfaces and the apex parts of the M-shaped section part form part of a spherical surface having a substantially equal radius from a center of the valve disk.

4. The centric butterfly valve according to claim 3, wherein
the top and bottom boss surfaces are formed to be spherical, and the valve disk is provided with an extended portion obtained by successively extending the spherical surface of each of the top and bottom boss surfaces to a blade portion side.

5. The centric butterfly valve according to claim 4, wherein
the top and bottom boss surfaces and the valley-bottom part of the M-shaped section part of the outer peripheral end of the blade portion of the valve disk are smoothly linked by tilted surfaces.

6. The centric butterfly valve according to claim 4, wherein
the extended part has a shape that extends most to the blade portion side at a position of the apex part of the outer peripheral end of the blade portion of the valve disk and is gradually narrower in width toward the most extended position.

7. The centric butterfly valve according to claim 1, wherein
a distance of the valley-bottom part of the M-shaped section part from a center of the valve disk is substantially equal to a distance of an inner peripheral surface of the valve body from the center of the valve disk.

8. The centric butterfly valve according to claim 1, wherein
an annular gap is provided at an outer periphery of the stem on each of the top and bottom boss surfaces.

9. The centric butterfly valve according to claim 5, wherein
the extended part has a shape that extends most to the blade portion side at a position of the apex part of the outer peripheral end of the blade portion of the valve disk and is gradually narrower in width toward the most extended position.

* * * * *